(12) United States Patent
Ishida et al.

(10) Patent No.: US 11,040,783 B2
(45) Date of Patent: Jun. 22, 2021

(54) COMPONENT MANUFACTURING METHOD AND COMPONENT MANUFACTURING SYSTEM

(71) Applicant: MITSUBISHI HEAVY INDUSTRIES, LTD., Tokyo (JP)

(72) Inventors: Makoto Ishida, Tokyo (JP); Yuji Ito, Tokyo (JP); Kanau Yamauchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 109 days.

(21) Appl. No.: 16/349,091

(22) PCT Filed: Oct. 16, 2017

(86) PCT No.: PCT/JP2017/037386
§ 371 (c)(1),
(2) Date: May 10, 2019

(87) PCT Pub. No.: WO2018/088140
PCT Pub. Date: May 17, 2018

(65) Prior Publication Data
US 2019/0276164 A1    Sep. 12, 2019

(30) Foreign Application Priority Data

Nov. 11, 2016   (JP) .............................. JP2016-220431

(51) Int. Cl.
*B64F 5/10*    (2017.01)
*B21J 15/28*   (2006.01)
(Continued)

(52) U.S. Cl.
CPC ................. *B64F 5/10* (2017.01); *B21J 15/28* (2013.01); *B23P 19/04* (2013.01); *B23P 21/002* (2013.01); *B25J 13/08* (2013.01); *B64C 1/12* (2013.01)

(58) Field of Classification Search
CPC .. B64F 5/10; B21J 15/28; B21J 15/142; B21J 15/42; B23P 19/04; B23P 21/002;
(Continued)

(56) References Cited

U.S. PATENT DOCUMENTS 4,885,836 A   12/1989 Bonomi et al.
6,536,100 B2   3/2003 Sarh et al.
(Continued)

FOREIGN PATENT DOCUMENTS

| JP | 2008-302399 A | 12/2008 |
| JP | 2011-194499 A | 10/2011 |
| WO | 2013-190648 A1 | 12/2013 |

OTHER PUBLICATIONS

International Search Report and Written Opinion in corresponding International Application No. PCT/JP2017/037386, dated Dec. 19, 2017 (14 pages).

*Primary Examiner* — John C Hong
(74) *Attorney, Agent, or Firm* — Osha Bergman Watanabe & Burton LLP

(57) ABSTRACT

A component manufacturing method includes a step in which a robot for attachment gripping a long frame presses the frame against a tabular skin and a step in which, in a state in which the frame is pressed against the skin, a robot for riveting gripping a first rivet inserts the first rivet into a first through-hole formed in the skin and a second through-hole formed in the frame. In the step, the robot for riveting changes a position in the gripped first rivet in a direction perpendicular to an axial direction of the first rivet according (Continued)

to a force received by the first rivet from the skin or the frame.

4 Claims, 4 Drawing Sheets

(51) Int. Cl.
*B23P 19/04* (2006.01)
*B25J 13/08* (2006.01)
*B23P 21/00* (2006.01)
*B64C 1/12* (2006.01)

(58) Field of Classification Search
CPC ........ B25J 13/08; B25J 13/085; B25J 9/1682; B25J 11/007; B64C 1/12
See application file for complete search history.

(56) References Cited

U.S. PATENT DOCUMENTS

| 10,792,728 | B2 * | 10/2020 | Oberoi ................... B23P 19/10 |
| 2011/0225787 | A1 | 9/2011 | Sato et al. |
| 2012/0011693 | A1 | 1/2012 | Amirehteshami et al. |
| 2015/0100147 | A1 | 4/2015 | Izumi et al. |

* cited by examiner

COMPONENT MANUFACTURING METHOD AND COMPONENT MANUFACTURING SYSTEM

TECHNICAL FIELD

The present invention relates to a component manufacturing method and a component manufacturing system and, more particularly, to a component manufacturing method and a component manufacturing system for manufacturing an aircraft component produced by combining a skin, which is a tabular member, and a frame or a stringer, which is a long member.

BACKGROUND ART

An aircraft component such as a body is produced by, for example, fastening a frame or a stringer to a tabular member (a skin) with rivets and integrating the frame or the stringer and the tabular member. Conventionally, for assembly of these members, in a state in which the skin is fixed to a table-like jig, the frame or the stringer positioned by another positioning jig are superimposed and thereafter the frame or the stringer is temporarily tacked to the skin by rivets for temporary tacking. After the temporary tacking is completed and an inspection is finished, regular rivets are riveted into predetermined rivet fastening positions. Consequently, an aircraft component obtained by integrating the skin, the frame, and the stringer is produced.

PTL 1 described below discloses a technique for setting, across a target member to be riveted, an automatic device on the opposite side of a side where an operator manually performs riveting and moving the automatic device, which includes an end effector including a drill or a riveter, along a guide structure according to riveting positions.

CITATION LIST

Patent Literature

[PTL 1]
U.S. Pat. No. 6,536,100

SUMMARY OF INVENTION

Technical Problem

Conventionally, when rivets for temporary tacking are riveted into two members (e.g., a skin and a frame or the skin and a stringer) not temporarily tacked by rivets for temporary tacking, in general, an operator manually performs riveting using a hand-held tool. When such a riveting process of the rivets is performed by an industrial robot including an arm, it is necessary to examine a way of pressing members, a procedure of riveting, and the like.

The present invention has been devised in view of such circumstances, and an object of the present invention is to provide a component manufacturing method and a component manufacturing system capable of, in superimposing and assembling two members, easily performing riveting of a second member to a first member.

Solution to Problem

A component manufacturing method according to a first aspect of the present invention includes: a first step in which a robot for attachment gripping a long second member presses the second member against a tabular first member; and a second step in which, in a state in which the second member is pressed against the first member, a robot for riveting gripping a first rivet inserts the first rivet into a first through-hole formed in the first member and a second through-hole formed in the second member. In the second step, the robot for riveting changes a position in the gripped first rivet in a direction perpendicular to an axial direction of the first rivet according to a force received by the first rivet from the first member or the second member.

With this configuration, since the long second member is pressed against the tabular first member by the robot for attachment, a gap is absent between the first member and the second member. In this state, the first rivet is inserted into the first through-hole formed in the first member and the second through-hole formed in the second member and is thereafter riveted. Consequently, the first member and the second member are surely fastened. When the first rivet is inserted into the first through-hole and the second through-hole, a position of the first rivet gripped by the robot for riveting in the direction perpendicular to the axial direction of the first rivet is changed according to a force received from the first member or the second member. Therefore, the first rivet does not hit the edges of the first through-hole and the second through-hole and does not rub against the inner wall surfaces of the first through-hole and the second through-hole. The first rivet is smoothly inserted into the first through-hole and the second through-hole.

The change of the position in the first rivet in the direction perpendicular to the axial direction of the first rivet corresponding to the force received from the first member or the second member may be realized by reducing a gripping force of the first rivet by the robot for riveting or may be realized by a float function of the robot for riveting, that is, position control of an arm or a hand of the robot based on a detection of a force.

In the first aspect, the component manufacturing method may include: a third step in which, after the riveting of the first rivet is completed, a robot for pressing presses the first member against the second member from a surface on an opposite side of a side where the second member is set; a fourth step in which a force detecting unit set in the robot for pressing detects a force generated in the robot for pressing by a pressing force to the first member; a fifth step of adjusting, based on the force detected by the force detecting unit, the pressing force to the first member by the robot for pressing; and a sixth step in which, in a state in which the first member is pressed against the second member, the robot for riveting gripping a second rivet inserts the second rivet into a third through-hole formed in the first member to be adjacent to the first through-hole and a fourth through-hole formed in the second member to be adjacent to the second through-hole.

When the second rivet is riveted after first riveting of the first rivet is completed between the tabular first member and the long second member, the robot for attachment gripping the second member cannot further press the long second member toward the tabular first member in a second or subsequent riveting position of the second rivet. On the other hand, with the configuration explained above, since the tabular first member is pressed against the long second member by the robot for pressing, a gap is absent between the second member and the first member. In this state, the second rivet is inserted into the third through-hole formed in the first member and the fourth through-hole formed in the second member and is thereafter riveted. Consequently, the first member and the second member are surely fastened.

Since the third through-hole is adjacent to the first through-hole and the fourth through-hole is adjacent to the second through-hole, the second rivet is inserted and riveted adjacent to the first rivet. Since the next second rivet is riveted adjacent to the first rivet riveted earlier, a gap is less easily formed between the first member and the second member. Since the pressing force to the first member by the robot for pressing is adjusted based on the force detected by the force detecting unit, it is possible to prevent formation of a gap between the members due to insufficient pressing to the first member and damage such as a dent to the first member.

A component manufacturing method according to a second aspect of the present invention includes: a third step in which, after first riveting of a first rivet is completed between a tabular first member and a long second member, a robot for pressing presses the first member against the second member from a surface on an opposite side of a side where the second member is set; a fourth step in which a force detecting unit set in the robot for pressing detects a force generated in the robot for pressing by a pressing force to the first member; a fifth step of adjusting, based on the force detected by the force detecting unit, the pressing force to the first member by the robot for pressing; and a sixth step in which, in a state in which the first member is pressed against the second member, a robot for riveting gripping a second rivet inserts the second rivet into a third through-hole formed in the first member to be adjacent to the first through-hole into which the first rivet is inserted and a fourth through-hole formed in the second member to be adjacent to the second through-hole into which the first rivet is inserted.

A component manufacturing system according to a third aspect of the present invention includes: a robot for attachment that grips a long second member and presses the second member against a tabular first member; and a robot for riveting that grips a first rivet and, in a state in which the second member is pressed against the first member, inserts the first rivet into a first through-hole formed in the first member and a second through-hole formed in the second member. The robot for riveting includes a control unit that changes a position in the gripped first rivet in a direction perpendicular to an axial direction of the first rivet according to a force received by the first rivet from the first member or the second member.

A component manufacturing system according to a fourth aspect of the present invention includes: a robot for pressing that, after first riveting of a first rivet is completed between a tabular first member and a long second member, presses the first member against the second member from a surface on an opposite side of a side where the second member is set; and a robot for riveting that grips a second rivet and, in a state in which the first member is pressed against the second member, inserts the second rivet into a third through-hole formed in the first member to be adjacent to a first through-hole into which the first rivet is inserted and a fourth through-hole formed in the second member to be adjacent to a second through-hole into which the first rivet is inserted. The robot for pressing includes: a force detecting unit that detects a force generated in the robot for pressing by a pressing force to the first member; and a driving control unit that adjusts, based on the force detected by the force detecting unit, the pressing force to the first member by the robot for pressing.

Advantageous Effects of Invention

According to the present invention, when two members are superimposed and assembled, it is possible to easily perform riveting of a second member to a first member.

DESCRIPTION OF EMBODIMENTS

An embodiment of the present invention is explained below with reference to the drawings.

When an aircraft component is assembled, an aircraft component manufacturing system 1 according to an embodiment of the present invention can surely bring a frame or a stringer, which is a long member, into contact with, in particular, a skin, which is a tabular member, and surely fasten the skin and the frame or the stringer with rivets. The aircraft component is, for example, a body, a main wing, or the like of an aircraft. In the following explanation, when the body of the aircraft is manufactured, the case of combining the skin, which is the tabular member, and the frame or the stringer, which is the long member, will be explained.

The skin has an arcuate shape in a cross section cut perpendicularly to a machine axis direction of the aircraft. The frame is a member disposed along the circumference of the skin. The frame has an arcuate shape and has a curvature. The stringer is a member disposed in parallel to the machine axis direction of the aircraft with respect to the skin and is a linear member. The frame or the stringer is attached to the skin, whereby the aircraft component such as the body is produced.

At this time, positioning during attachment of the frame or the stringer to the skin can be performed based on a through-hole formed in the skin and a through-hole formed in the frame or the stringer. The skin and the frame or the skin and the stringer can be integrated by inserting rivets for temporary tacking through the through-hole formed in the skin and the through-hole formed in the frame or the stringer and fastening the rivets for temporary tacking to the through-holes. Note that the through-holes are holes formed to pierce through the skin and the frame or the stringer. The through-holes can be used for positioning during the attachment of the frame or the stringer to the skin. Rivets can be inserted through the through-holes.

Figure 1:
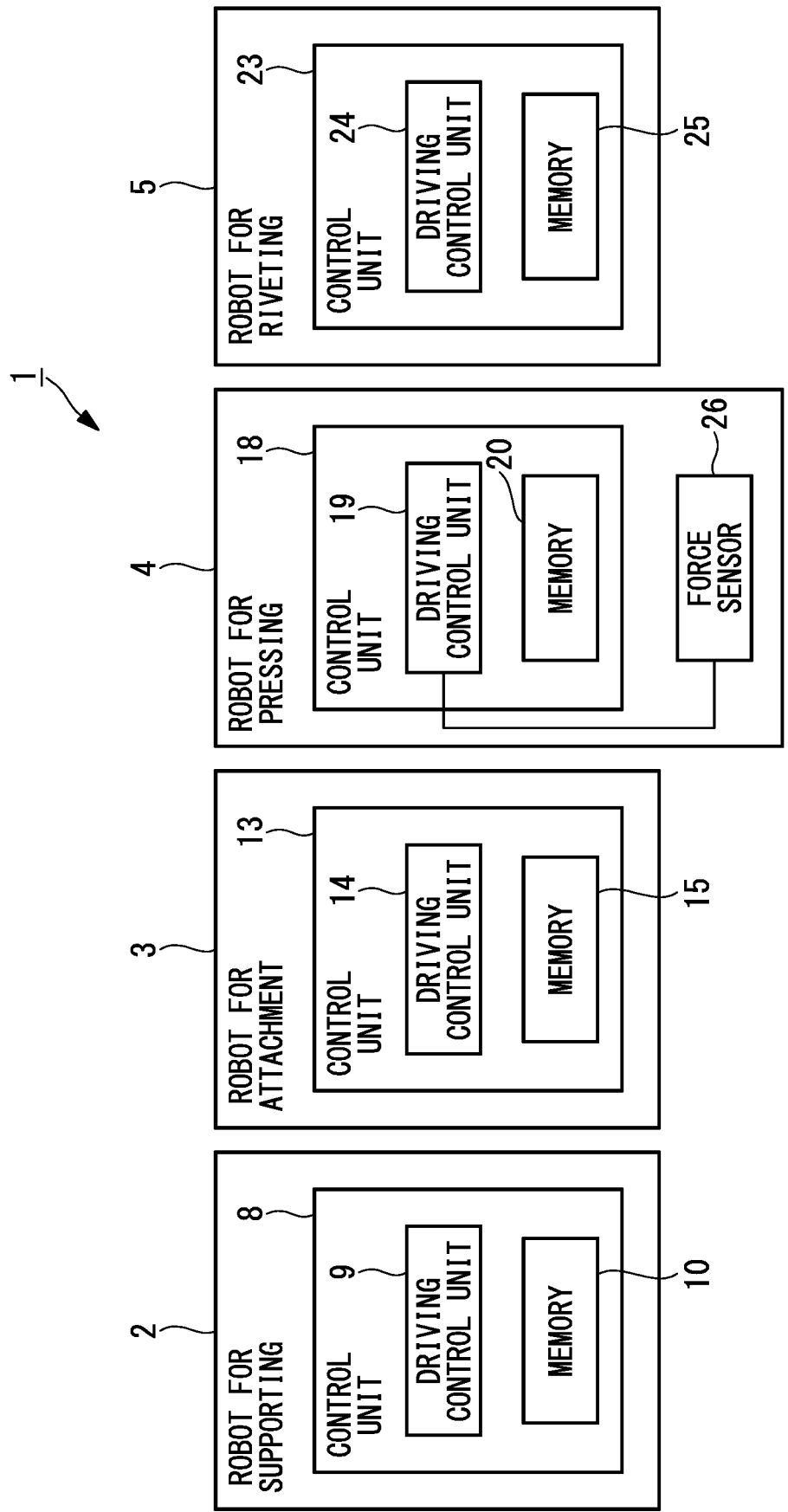
FIG. 1 is a block diagram showing an aircraft component manufacturing system according to an embodiment of the present invention.

The aircraft component manufacturing system 1 includes, as shown in FIG. 1, two robots for supporting 2 that support the skin, a robot for attachment 3 that grips the frame or the stringer, a robot for pressing 4 that presses the skin to the frame or stringer side, and a robot for riveting 5 that performs riveting on the skin and the frame or the skin and the stringer.

Figure 2:
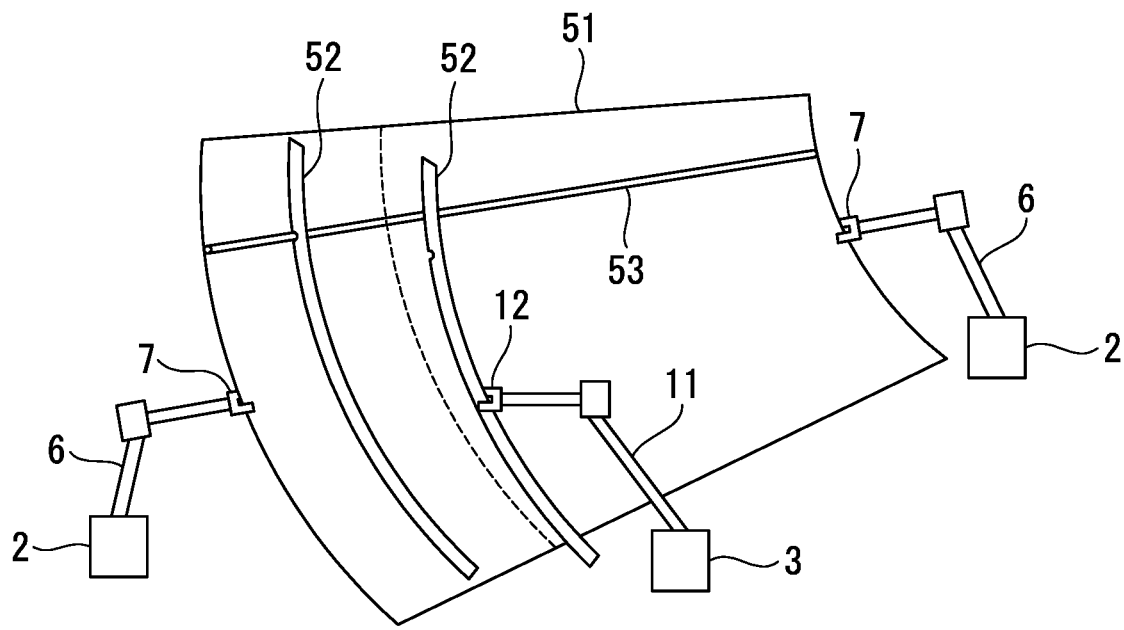
FIG. 2 is a schematic diagram showing a robot for supporting and a robot for attachment, a skin, a frame, and a stringer according to the embodiment of the present invention.

The robots for supporting 2 include arms 6 as shown in FIG. 2. Hands 7 that grip a skin 51 are attached to the distal ends of the arms 6. The hands 7 grip, for example, the centers of end portions having arcuate shapes of the skin 51, whereby the robots for supporting 2 support the skin 51. The robots for supporting 2 are controlled by control units 8.

The control units 8 of the robots for supporting 2 include, as shown in FIG. 1, driving control units 9 and memories 10. The operation of the control units 8 is realized by a hardware resource such as a CPU executing a program recorded in advance.

Based on data concerning a supporting position and a supporting direction recorded in the memories 10 in advance, the driving control units 9 drive the arms 6 of the robots for supporting 2, move the skin 51 to the supporting position recorded in advance, and tilt the skin 51 at an angle recorded in advance. As a result, the skin 51 is adjusted to a position and an angle for easily attaching a frame 52 or a stringer 53 by the robots for supporting 2.

The robot for attachment 3 includes an arm 11. A hand 12 that grips the frame 52 or the stringer 53 is attached to the distal end of the arm 11. The hand 12 grips, for example, the center of the frame 52 or the stringer 53, whereby the robot for attachment 3 supports and moves the frame 52 or the stringer 53. The robot for attachment 3 is controlled by a control unit 13.

The control unit 13 of the robot for attachment 3 includes, as shown in FIG. 1, a driving control unit 14 and a memory 15. The operation of the control unit 13 is realized by a hardware resource such as a CPU executing a program recorded in advance.

Based on data concerning an attachment position recorded in the memory 15 in advance, the driving control unit 14 drives the arm 11 of the robot for attachment 3 and moves the frame 52 or the stringer 53 to the attachment position recorded in advance. As a result, the frame 52 or the stringer 53 is superimposed on the skin 51 by the robot for attachment 3.

Figure 4:
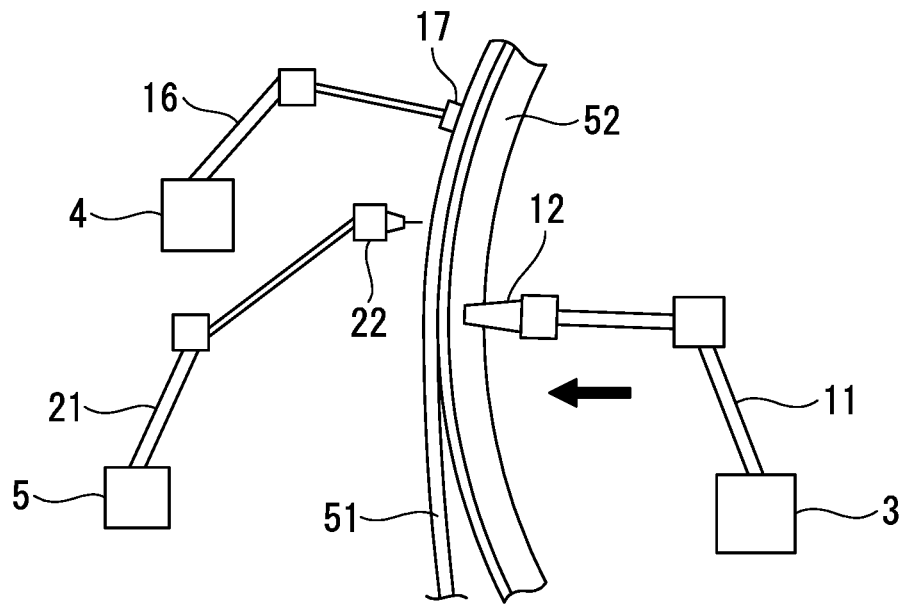
FIG. 4 is a schematic diagram showing the robot for attachment, a robot for pressing, and the robot for riveting, the skin, and the frame according to the embodiment of the present invention.
Figure 5:
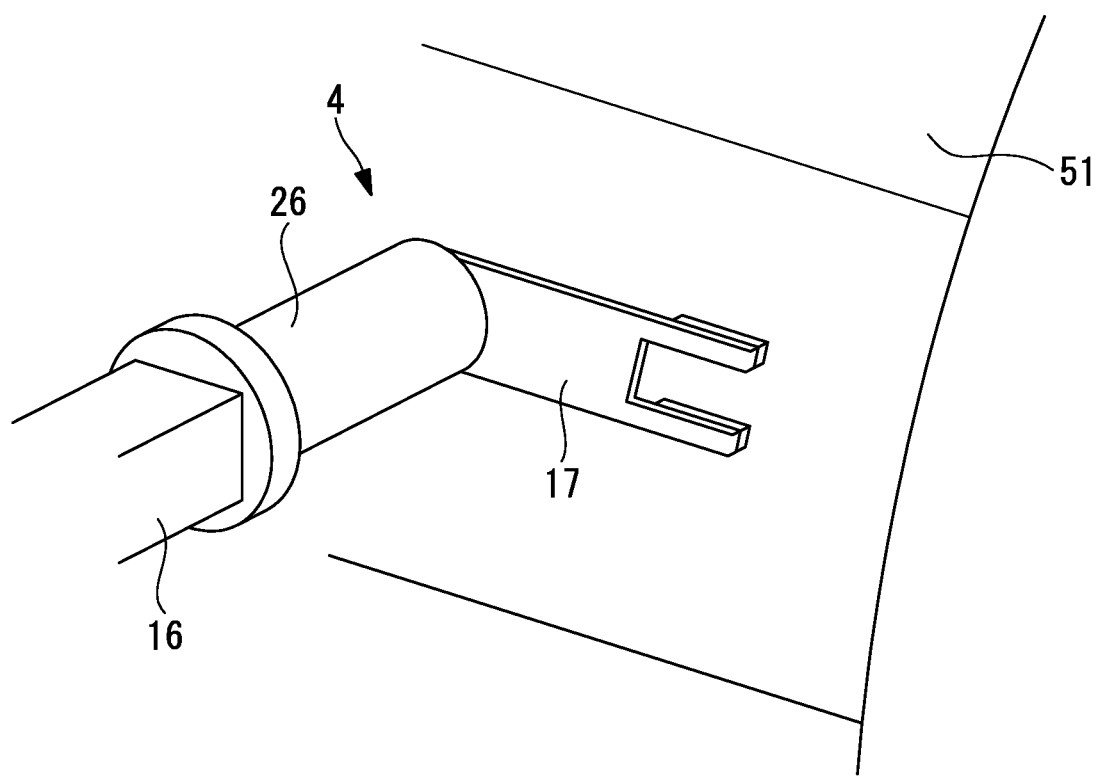
FIG. 5 is a perspective view showing the robot for pressing and the skin according to the embodiment of the present invention.

The robot for pressing 4 includes an arm 16 as shown in FIG. 4 and FIG. 5. A pressing unit 17 that presses the skin 51 from the outer circumferential surface side of the skin 51 on the opposite side of a surface on which the frame 52 or the stringer 53 is set is attached to the distal end of the arm 16. The robot for pressing 4 is controlled by a control unit 18. The operation of the control unit 18 is realized by a hardware resource such as a CPU executing a program recorded in advance.

The control unit 18 of the robot for pressing 4 includes, as shown in FIG. 1, a driving control unit 19 and a memory 20.

Based on data concerning a pressing position recorded in the memory 20 in advance, the driving control unit 19 drives the arm 16 of the robot for pressing 4 and moves the arm 16 and the pressing unit 17 to the pressing position recorded in advance. As a result, the skin 51 is pressed against the frame 52 or the stringer 53 by the pressing unit 17 of the robot for pressing 4.

The pressing unit 17 includes one or two or more flat plates. A plate surface of the flat plate(s) is in contact with the skin 51. An elastic member such as a sponge may be provided on the plate surface of the flat plate(s) in order to prevent a dent of the skin 51.

A force sensor (a force detecting unit) 26 is set in a connecting portion of the pressing unit 17 and the arm 16 or near the connecting portion, for example, a wrist of the arm 16. The force sensor 26 detects a force generated in the robot for pressing 4 by a pressing force to the skin 51. Data concerning the detected force is transmitted to the driving control unit 19. The driving control unit 19 adjusts the pressing force to the skin 51 by the robot for pressing 4 based on the detected force. Consequently, the pressing force to the skin 51 by the robot for pressing 4 is adjusted based on the force detected by the force sensor 26. As a result, it is possible to prevent a gap from being formed between the skin 51 and the frame 52 or between the skin 51 and the stringer 53 by insufficient pressing to the skin 51. It is possible to prevent damage such as a dent to the skin 51.

Figure 3:
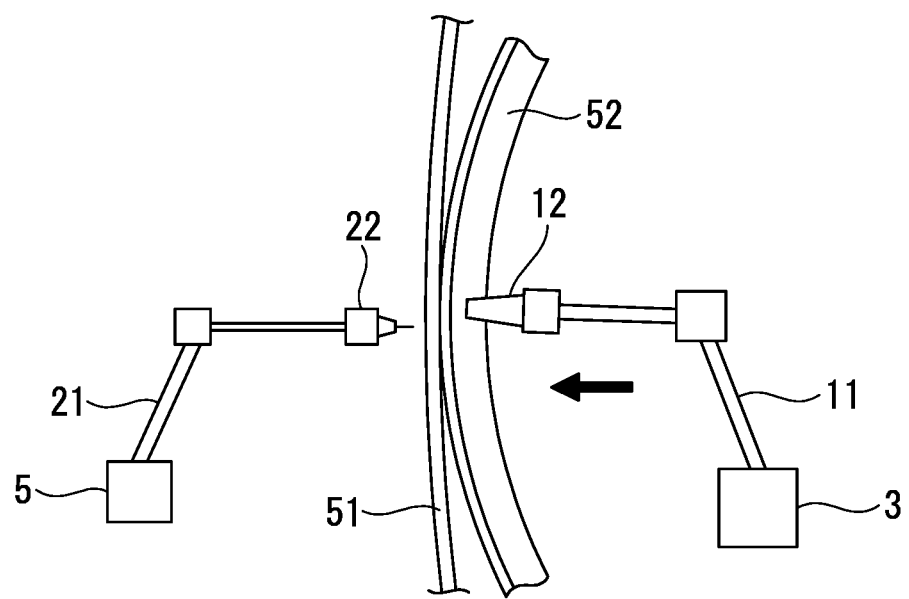
FIG. 3 is a schematic diagram showing the robot for attachment and a robot for riveting, the skin, and the frame according to the embodiment of the present invention.

The robot for riveting 5 includes an arm 21 as shown in FIG. 3 and FIG. 4. A hand 22 that grips a rivet or a riveting device (not shown in the figures) is attached to the distal end of the arm 21. The hand 22 of the robot for riveting 5 can grip the rivet and insert the rivet through a through-hole. The robot for riveting 5 can rivet the rivet inserted through the through-hole using the riveting device. The robot for riveting 5 is controlled by a control unit 23.

The control unit 23 of the robot for riveting 5 includes, as shown in FIG. 1, a driving control unit 24 and a memory 25. The operation of the control unit 23 is realized by a hardware resource such as a CPU executing a program recorded in advance.

Based on data concerning a riveting position recorded in the memory 25 in advance, the driving control unit 24 drives the arm 21 of the robot for riveting 5, moves the rivet to the riveting position recorded in advance, and inserts the rivet into a through-hole. As a result, the rivet is inserted into through-holes formed in the skin 51 and the frame 52 or through-holes formed in the skin 51 and the stringer 53 and riveting is performed by the robot for riveting 5.

When inserting the rivet into the through-holes, the driving control unit 24 changes a position in the gripped rivet in a direction perpendicular to the axial direction of the rivet according to a force received by the rivet from the skin 51, the frame 52, or the stringer 53. Consequently, the rivet does not hit the edges of the through-holes and does not rub against the inner wall surfaces of the through-holes. The rivet is smoothly inserted into the through-holes. In order to change the position in the direction perpendicular to the axial direction of the rivet, the driving control unit 24 reduces a gripping force of the rivet by the robot for riveting 5. Alternatively, in order to change the position in the direction perpendicular to the axial direction of the rivet, the driving control unit 24 may perform a float function, that is, position control of the arm 21 or the hand 22 based on detection of a force.

Figure 6:
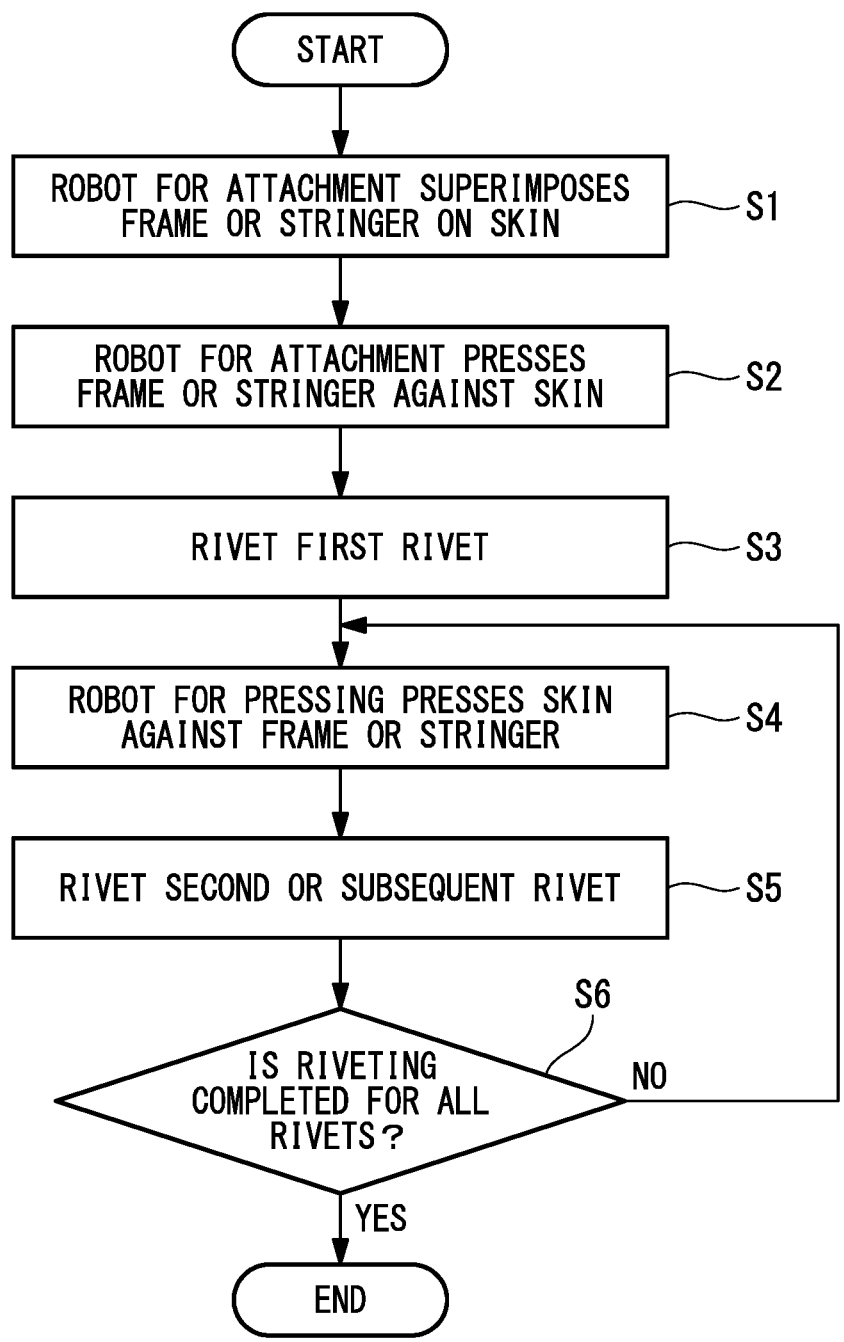
FIG. 6 is a flowchart showing a method of manufacturing an aircraft component using the aircraft component manufacturing system according to the embodiment.

A method of manufacturing an aircraft component using the aircraft component manufacturing system 1 according to this embodiment is explained with reference to FIG. 6. This embodiment is suitable for a method of inserting a rivet for temporary tacking through the through-hole formed in the skin 51 and the through-hole formed in the frame 52 or the stringer 53 and fastening the rivet for temporary tacking to the through-holes (temporary fastening). Therefore, in the following explanation, a riveting process of the temporary fastening is explained.

This method is divided into a process for inserting and fastening the rivet to the first through-hole and a process for inserting the rivet into a second or subsequent through-hole and fastening the rivet to the through-hole. In this embodiment, the long frame 52 or the long stringer 53 is riveted to the tabular skin 51. Therefore, rivets are riveted in a row.

In the process for inserting and fastening the rivet to the first through-hole, first, the robot for attachment 3 attaches the frame 52 or the stringer 53 to the skin 51 supported by the robots for supporting 2. In this attaching process, based on data concerning an attachment position, the robot for attachment 3 moves the frame 52 or the stringer 53 to the attachment position and superimposes the frame 52 or the string 53 on the skin 51 (step S1).

At this time, since the rivet is fastened to the first through-hole, the robot for attachment 3 presses the frame 52 or the string 53 toward the skin 51 (step S2). Consequently, a gap is absent between the skin 51 and the frame 52 or between the skin 51 and the stringer 53.

Thereafter, the robot for riveting 5 inserts the rivet through the through-holes of the skin 51 and the frame 52 superimposed each other or the skin 51 and the stringer 53 superimposed each other and fastens the skin 51 and the frame 52 or the stringer 53 with the rivet (step S3). At this time, when the rivet is inserted into the through-holes, a position in the gripped rivet in a direction perpendicular to the axial direction of the rivet is changed according to a force received by the rivet from the skin 51, the frame 52, or the stringer 53. Consequently, the rivet does not hit the edges of the through-holes and does not rub against the inner wall surfaces of the through-holes. The rivet is smoothly inserted into the through-holes.

The process for inserting and fastening the rivet to the through-hole is performed in a state in which the two robots for supporting 2 support the skin 51 and the robot for attachment 3 supports the frame 52 or the stringer 53.

In this attachment step, the robot for pressing 4 presses the skin 51 against the frame 52 or the stringer 53 from the outer circumferential surface side of the skin 51, that is, the opposite side of the surface on which the frame 52 or the stringer 53 is set (step S4).

Based on data concerning a pressing position set near the attachment position of the rivet, the robot for pressing 4 moves the pressing unit 17 to near the pressing position. The robot for pressing 4 performs pressing of the skin 51 considering a pressing force to the skin 51 by the pressing unit 17. Consequently, a gap is absent between the skin 51 and the frame 52 or between the skin 51 and the stringer 53.

The pressing force to the skin 51 by the pressing unit 17 is adjusted, based on a force detected by the force sensor 26 set in the pressing unit 17 of the robot for pressing 4, such that the detected force has a predetermined value.

Thereafter, the robot for riveting 5 inserts the rivet through the through-holes of the skin 51 and the frame 52 superimposed each other or of the skin 51 and the stringer 53 superimposed each other and fastens the skin 51 and the frame 52 or the stringer 53 with the rivet (step S5). At this time, when the rivet is inserted into the through-holes, a position in the gripped rivet in a direction perpendicular to the axial direction of the rivet is changed according to a force received by the rivet from the skin 51, the frame 52, or the stringer 53. Consequently, the rivet does not hit the edges of the through-holes and does not rub against the inner wall surfaces of the through-holes. The rivet is smoothly inserted into the through-holes.

The rivet is inserted through a third or subsequent through-hole and fastened to the through-hole in the same manner as the process for inserting the rivet into the second through-hole and fastening the rivet to the through-hole explained above. In fastening to one frame 52 or one stringer 53, it is determined whether all rivets for temporary tacking are riveted (step S6). The pressing by the robot for pressing 4 (step S4) and the riveting (step S5) are repeated until all the rivets are fastened.

As explained above, according to this embodiment, when the riveting is performed for the skin 51 and the frame 52 or the skin 51 and the stringer 53, in first riveting, the frame 52 or the stringer 53 is pressed against the skin 51 by the robot for attachment 3 and, in second or subsequent riveting, the skin 51 is pressed against the frame 52 or the stringer 53 by the robot for pressing 4. At this time, the frame 52 or the stringer 53 plays a role like a conventional fixing jig. A gap is absent between the skin 51 and the frame 52 or between the skin 51 and the stringer 53.

As order of inserting the rivet into the through-holes, riveting into the through-hole corresponding to a position where the robot for riveting 5 can most highly accurately performs positioning and highly accurately perform riveting is performed first. In the case of the frame 52 set vertically, after riveting is performed into the first through-hole, riveting is performed into the through-holes adjacent to the first through-hole in the upper side and the lower side. Thereafter, riveting is performed into the through-holes adjacent to the through-hole, for which the riveting is completed, on the upper side and the lower side.

Consequently, the skin 51 is drawn toward the upper end portion or the lower end portion centering on a fastening position by the first through-hole. As a result, the skin 51 and the frame 52 are fastened without a gap being formed between the skin 51 and the frame 52.

In the case of the stringer 53 set in the horizontal direction, after riveting is performed into the first through-hole, riveting is performed into the through-holes adjacent to the first through-hole on the left side and the right side. Thereafter, riveting is performed into the through-holes adjacent to the through-hole, which the riveting is completed, on the left side and the right side. Consequently, the skin 51 is drawn toward the end portion on the left side or the right side centering on a fastening position by the first through-hole. As a result, the skin 51 and the stringer 53 are fastened without a gap being formed between the skin 51 and the stringer 53.

REFERENCE SIGNS LIST

1 aircraft component manufacturing system
2 robot for supporting
3 robot for attachment
4 robot for pressing
5 robot for riveting
6 arm
7 hand
8 control unit
9 driving control unit
10 memory
11 arm
12 hand
13 control unit
14 driving control unit
15 memory
16 arm
17 pressing unit
18 control unit
19 driving control unit
20 memory
21 arm
22 hand 23 control unit
24 driving control unit
25 memory
26 force sensor
51 skin
52 frame
53 stringer

The invention claimed is:

1. A component manufacturing method comprising:
a step in which a robot for attachment grips a second member and presses the second member against a tabular first member;
a step in which, in a state where the second member is pressed against the first member, a robot for riveting grips a first rivet and inserts the first rivet, in an axial direction of the first rivet, into a first through-hole formed in the first member and a second through-hole formed in the second member;
a step in which, after the riveting of the first rivet is completed, a robot for pressing presses the first member against the second member from a surface on an opposite side of a side where the second member is disposed;
a step in which a force detecting unit in the robot for pressing detects a force generated in the robot for pressing by a pressing force to the first member;
a step of adjusting, based on the force detected by the force detecting unit, the pressing force to the first member by the robot for pressing; and
a step in which, in a state where the first member is pressed against the second member, the robot for riveting grips a second rivet and inserts the second rivet into a third through-hole formed in the first member to be adjacent to the first through-hole and a fourth through-hole formed in the second member to be adjacent to the second through-hole, wherein
when inserting the first rivet, the robot for riveting changes a position in the gripped first rivet in a direction perpendicular to the axial direction and then inserts the first rivet in the axial direction according to a force received by the first rivet from the first member or the second member.

2. A component manufacturing method comprising:
a step in which, after first riveting of a first rivet is completed between a tabular first member and a second member, a robot for pressing presses the first member against the second member from a surface on an opposite side of a side where the second member is disposed;
a step in which a force detecting unit in the robot for pressing detects a force generated in the robot for pressing by a pressing force to the first member;
a step of adjusting, based on the force detected by the force detecting unit, the pressing force to the first member by the robot for pressing; and
a step in which, in a state where the first member is pressed against the second member, a robot for riveting grips a second rivet and inserts the second rivet into a third through-hole formed in the first member to be adjacent to the first through-hole into which the first rivet is inserted and a fourth through-hole formed in the second member to be adjacent to the second through-hole into which the first rivet is inserted.

3. A component manufacturing system comprising:
a robot for attachment that grips a second member and presses the second member against a tabular first member;
a robot for riveting
that grips a first rivet and, in a state where the second member is pressed against the first member, inserts the first rivet in an axial direction of the first rivet into a first through-hole formed in the first member and a second through-hole formed in the second member, or
that grips a second rivet and, in a state where the second member is pressed against the first member, inserts the second rivet in an axial direction of the second rivet into a third through-hole formed in the first member and a fourth through-hole formed in the second member;
a robot for pressing; and
a control unit, wherein
the robot for pressing includes a force detecting unit that detects a force generated in the robot for pressing by a pressing force to the first member, and
the control unit controls:
the robot for riveting to change a position in the gripped first rivet in a direction perpendicular to the axial direction according to a force received by the first rivet from the first member or the second member and then to insert the first rivet in the axial direction,
after the riveting the first rivet is completed, the robot for pressing to press the first member against the second member form a surface on an opposite side of a side where the second member is disposed,
the robot for pressing to adjust the pressing force to the first member based on the force detected by the force detecting unit, and
the robot for riveting to insert the gripped second rivet in the axial direction.

4. A component manufacturing system comprising:
a robot for pressing that, after first riveting of a first rivet is completed between a tabular first member and a second member, presses the first member against the second member from a surface on an opposite side of a side where the second member is disposed; and
a robot for riveting that grips a second rivet and, in a state where the first member is pressed against the second member, inserts the second rivet into a third through-hole formed in the first member to be adjacent to a first through-hole into which the first rivet is inserted and a fourth through-hole formed in the second member to be adjacent to a second through-hole into which the first rivet is inserted, wherein
the robot for pressing includes:
a force detecting unit that detects a force generated in the robot for pressing by a pressing force to the first member; and
a driving control unit that adjusts, based on the force detected by the force detecting unit, the pressing force to the first member by the robot for pressing.

* * * * *